United States Patent [19]

DiLeone et al.

[11] 4,085,166
[45] Apr. 18, 1978

[54] IMPACT RESISTANT ACRYLIC POLYMER COMPOSITION

[75] Inventors: Roland Ralph DiLeone, Rowayton; Albert George Robustelli, Darien, both of Conn.

[73] Assignee: American Cyanamid Company, Stamford, Conn.

[21] Appl. No.: 798,200

[22] Filed: May 18, 1977

[51] Int. Cl.$^2$ .................. C08L 51/00; C08L 53/00
[52] U.S. Cl. ........................ 260/876 R; 260/880 R
[58] Field of Search ................. 260/876 B, 880 R

[56] References Cited

U.S. PATENT DOCUMENTS

| | | | |
|---|---|---|---|
| 3,261,887 | 7/1966 | Mann | 260/876 R |
| 3,354,238 | 11/1967 | Schmitt et al. | 260/876 R |
| 3,956,424 | 5/1976 | Murayama et al. | 260/876 R |

*Primary Examiner*—Richard B. Turer
*Attorney, Agent, or Firm*—Frank M. Van Riet

[57] ABSTRACT

A molding composition of improved toughness, thermal stability, flow and stress craze resistance comprising (A) from about 70 to about 95% of a resinous terpolymer of 65 to 75 parts of methylmethacrylate, 18 to 24 parts of styrene and 2 to 12 parts of ethylacrylate and (B) 5% to 30% of polybutadiene grafted with 17 to 22 parts of methylmethacrylate, 4 to 7 parts of styrene and 0 to 3 parts of ethylacrylate, the ratio of polybutadiene to monomer in (B) ranging from 1:1 to 4:1, respectively.

8 Claims, No Drawings

IMPACT RESISTANT ACRYLIC POLYMER COMPOSITION

BACKGROUND OF THE INVENTION

It has been known to prepare thermoplastic molding compositions from various polymers and rubber latices. These compositions have been prepared by blending the polymers with the grafted rubber or by polymerizing the monomers used to produce the polymer in the presence of the rubber. For example, U.S. Pat. No. 3,354,238 discloses such a molding composition wherein the resinous phase is composed of methylmethacrylate, styrene and acrylonitrile, and the rubber phase is composed of polybutadiene grafted with methylmethacrylate, styrene and acrylonitrile. The compositions of said patent are said to exhibit improved clarity, heat distortion temperature, impact strength, color and gloss. Similarly, U.S. Pat. No. 3,261,887 discloses a molding composition substantially identical to that of the above-discussed patent except that the acrylonitrile is omitted therefrom.

The latter patent exhibits a series of acceptable properties when utilized as a molding composition but exhibits a poor craze resistance and a poor tensile elongation whereas the composition containing the acrylonitrile has been found to exhibit a yellowness which has become increasingly unacceptable over the years since the issuance of said patent. Furthermore, acrylonitrile has recently been determined to be a carcinogen which renders it undesirable as a component in compositions used to manufacture food packaging.

DESCRIPTION OF THE INVENTION INCLUDING PREFERRED EMBODIMENTS

It has now been discovered that the acrylonitrile component of the above-described molding composition of U.S. Pat. No. 3,354,238 can be replaced by ethylacrylate to the extent that the overall physical properties of the resultant compositions are not deleteriously reduced, and the objectable characteristics of the compositions attributable to the presence of acrylonitrile are obviated. The compositions of the instant invention exhibit excellent toughness, thermal stability flow and stress craze resistance and, as a result, are more suited for usage in the production of articles of manufacture useful in the storage or transportation of commercial, industrial and household products. The compositions of the instant invention comprise a blend of from about 70 to about 90%, preferably from about 75 to about 85% of a resinous terpolymer of from about 65 to 75 parts of methylmethacrylate, from about 18 to about 24 parts of styrene and from about 2 to about 12 parts of ethylacrylate and, correspondingly, from about 5 to about 30%, preferably from about 10 to about 25%, of polybutadiene grafted with from about 17 to 22 parts of methylmethacrylate, 4 to 7 parts of styrene and 0 to 3 parts of ethylacrylate.

The compositions may be produced by blending the resinous terpolymer, which may be prepared by a free radical initiated reaction in the presence of a solvent and in a two-stage system whereby the monomer blend is charged to a first reactor and polymerized to about 20 to 40% solids and then in a second reactor where complete conversion is carried out, with the grafted polybutadiene in the appropriate amounts. Alternatively, the instant compositions may be prepared by interpolymerization of all the monomers, using a suitable emulsifier, in the presence of the polybutadiene rubber, preferably in latex form, under the conditions of grafting as discussed below.

Any known procedure may be utilized to produce the resinous terpolymer and the grafted polybutadiene components when they are to be blended to form the compositions of the instant invention. It is preferred, however, that the terpolymer be produced by blending the appropriate concentration of monomers is a solvent such as toluene at about a 60 to 80% monomers concentration. A suitable catalyst such as benzoyl peroxide, di-t-butyl peroxide and the like may be added in the presence of a molecular weight control additive such as an alkyl mercaptan e.g. n-dodecyl mercaptan, n-octyl mercaptan, t-dodecyl mercaptan, benzyl mercaptan and the like. As mentioned above, this polymerization is preferably conducted in a two-stage system whereby the monomer solution is charged to the first stage reactor and polymerized at from about 80° to 110° C. for from about 12 to 24 hours. The rate of conversion is preferably adjusted to from from 1 to 3% slids per hour. The first stage polymer is then preferably transferred to a second stage such as a plug flow reactor where complete conversion of the monomer to polymer is carried out. The final solids content generally ranges from about 60 to 70%. Catalysts may be used in amounts ranging from about 0.01 to 5.0 parts, by weight, based on the weight of the monomers. The molecular weight control additive can be used in like amounts, by weight, again based on the weight of the monomers.

There may be added to the terpolymer, after or during formation, such additives as heat and light stabilizers, antioxidants, lubricants, plasticizers, pigments, fillers, dyes and the like.

The grafted polybutadiene can likewise be prepared by any known process such as by free radical initiation utilizing the same catalysts as disclosed above. The polybutadiene to monomes ratio should be within the above range and the polybutadiene must be present in the final composition in the concentration disclosed.

The resinous terpolymer and the grafted polybutadiene components may be blended together in any known manner such as by utilizing a ball mill, hot rolls or the like.

It is preferred that the blending operation be carried out in a devolatilizer-extruder in a manner disclosed at column 3, lines 3 to 72 of the above-mentioned U.S. Pat. No. 3,354,238, which section thereof is hereby incorporated herein by reference.

As mentioned above, the compositions of the instant invention have utility where toughness, rigidity and transparency are necessary and may be utilized in the injection molding of highly engineered parts, blow molding and thermoforming of containers or other desired articles.

The following examples are set forth for purposes of illustration only and are not to be construed as limitations on the present invention except as set forth in the appended claims. All parts and percentages are by weight unless otherwise indicated.

EXAMPLES 1–3

A series of three monomer compositions are prepared prior to the following concentrations:

| 1 | 2 | 3 |
|---|---|---|
| 78.5 parts of methyl- | 73.0 parts methyl- | 69.5 parts methyl- |

-continued

| 1 | 2 | 3 |
|---|---|---|
| methacrylate | methacrylate | methacrylate |
| 21.5 parts styrene | 22.0 parts styrene | 22.5 parts styrene |
| 0.30 part di-t-butyl peroxide | 5.0 parts ethyl-acrylate | 8.0 parts ethyl-acrylate |
| 0.050 part n-dodecyl mercaptan | 0.30 part di-t-butyl peroxide | 0.30 part di-t-butyl peroxide |
| | 0.040 part n-dodecyl mercaptan | 0.027 part n-dodecyl mercaptan |

Each monomer composition is then polymerized in a two-stage system i.e. the monomer blends are individually charged to a first stage reactor and polymerized to about 28 to 30% solids at 90°–95° C. for 16–20 hours. The rate of conversion is about 2.0% solids per hour. When the appropriate solids content is reached, the first stage reaction material is then transferred to a plug flow reactor where complete conversion of monomer to polymer is carried out. The final solids content is 68 to 70%.

The rubber composition is prepared by blending 75.0 parts of polybutadiene, in latex form, with 19.6 parts of methylmethacrylate and 5.4 parts of styrene. The rubber to monomer ratio is 3:1. The monomers are then grafted onto the polybutadiene by a redox initiated polymerization using, based on monomer, 0.05 part of t-butylhydroperoxide, 0.6 part sodium formaldehyde sulfoxylate, 27 ppm ferric chloride .$6H_2O$ and 127 ppm ethylenediamine tetraacetic acid 0.4 Na salt, at room temperature for 5–10 hours.

20 Parts of the above-produced grafted rubber composition are then blended with 80 parts of each of the above-prepared polymer compositions so as to provide a final polybutadiene content of 15%. The blending is conducted on a devolatilizer-extruder at a temperature on the inlet end of about 250° F and at the die end of about 600° F under a vacuum of 25–27 in. Hg.

The resultant three transparent compositions are then formed into a series of samples and tested to determine the physical properties thereof. The results are set forth in Table I below.

TABLE I

| | Comp.* of Ex. 1 | Comp. of Ex. 2 | Comp. of Ex.3 |
|---|---|---|---|
| [1]Tensile Strength, psi | 7,000 | 6,800 | 6,100 |
| [1]Tensile Elongation, % | | | |
| Yield | 4.0 | 4.0 | 4.0 |
| Break | 10.9 | 15.8 | 23.3 |
| [1]Flexural Strength, psi | 11,400 | 11,100 | 10,100 |
| [1]Flexural Modulus, psi | 330,000 | 330,000 | 310,000 |
| [1]Notched Izod, fppi | 1.8 | 2.0 | 2.1 |
| [1]DTL, 264 psi, °C. | 84 | 81 | 74 |
| [2]Craze Resistance (0.0% Strain) | Failed | Passed | Passed |
| Spiral Flow (480° F), in. flow | 23.5 | 27.0 | 28.0 |
| [2]Tensile Elongation, % | 25.0 | 45.0 | 45.0 |
| [2]Falling Dart-fppi | 25.0 | 38.0 | 45.0 |
| [3]Thermal Stability at 560° F Extrusion | 0.26 | 0.16 | 0.05 |

[1]molded specimens
[2]sheet specimens - 20 mils.
[3]% residual methyl methacrylate monomer generated
*comparative

EXAMPLE 4

The procedure of Example 2 is again followed except that 18.0 parts of methyl methacrylate and 7.0 parts of styrene are employed in producing the grafted polybutadiene. Similar results are observed.

EXAMPLE 5

The procedure of Example 2 is again followed except that 22 parts of methyl methacrylate and 4.0 parts of styrene are employed in the production of the grafted polybutadiene. Again, an excellent composition is produced.

EXAMPLE 6

Again, following the procedure of Example 2 except that the terpolymer is produced from a monomer composition comprising 73.5 parts of methyl methacrylate, 24.5 parts of styrene and 2.0 parts of ethyl acrylate and the grafted polybutadiene is produced using a monomer charge of 17.37 parts of methyl methacrylate, 5.63 parts of styrene and 2.0 parts of ethyl acrylate. A tough, transparent, rigid molding composition is recovered.

EXAMPLE 7

The procedure of Example 2 is followed except that the resinous terpolymer is produced from a monomer charge of 66 parts of methyl methacrylate, 23 parts of styrene and 11 parts of ethyl acrylate. Again, an excellent molding composition is recovered.

EXAMPLE 8

The procedure of Example 2 is again followed except that the monomers are grafted onto the polybutadiene as follows:

18.25 parts of methyl methacrylate
5.50 parts of styrene
1.25 parts of ethyl acrylate The properties of the resultant molding composition are closely akin to those of Example 2.

We claim:

1. A molding composition characterized by exhibiting excellent toughness, thermal stability, flow and stress craze resistance comprising
   (A) from about 70% to about 95% of a resinous terpolymer comprising from about 65 to 75 parts of methylmethacrylate, from about 18 to 24 parts of styrene and from about 2 to 12 parts of ethylacrylate and
   (B) from about 5% to about 30% of polybutadiene grafted with from about 17 to 22 parts of methylmethacrylate, from about 4 to 7 parts of styrene and 0 to 3 parts of ethylacrylate, the ratio of polybutadiene to monomer in (B) ranging from about 1:1 to about 4:1, respectively 2. A composition according to claim 1 wherein (A) is a terpolymer of 73 parts of methylmethacrylate, 22 parts of styrene and 5 parts of ethyacrylate.

3. A composition according to claim 1 wherein (A) is a terpolymer of 69.5 parts of methylmethacrylate, 22.5 parts of styrene and 8 parts of ethylacrylate.

4. A composition according to claim 1 wherein (B) is polybutadiene grafted with 19.6 parts of methylmethacrylate and 5.4 parts of styrene.

5. A composition according to claim 1 wherein the polybutadiene to monomer ratio is 3:1, respectively.

6. A composition according to claim 1 containing 80% of (A) and 20% of (B).

7. A composition according to claim 1 wherein (A) is a terpolymer of 73 parts of methylmethacrylate, 22 parts of styrene and 5 parts of ethylacrylate and (B) is polybutadiene grafted with 19.6 parts of methylmethacrylate and 5.4 parts of styrene.

8. A composition according to claim 1 wherein (A) is a terpolymer of 69.5 parts of methylmethacrylate, 22.5 parts of styrene and 8 parts of ethylacrylate and (B) is polybutadiene grafted with 19.6 parts of methylmethacrylate and 5.4 parts of styrene.

* * * * *